E. S. HAWLEY.
Pyrometers.

No. 158,211.  Patented Dec. 29, 1874.

Witnesses:  Elias S. Hawley, Inventor
by Jay Hyatt
his Atty.

UNITED STATES PATENT OFFICE.

ELIAS S. HAWLEY, OF BUFFALO, NEW YORK.

IMPROVEMENT IN PYROMETERS.

Specification forming part of Letters Patent No. 158,211, dated December 29, 1874; application filed July 14, 1874.

*To all whom it may concern:*

Be it known that I, ELIAS S. HAWLEY, of the city of Buffalo, in the county of Erie and State of New York, have invented certain Improvements in Pyrometers, of which the following is a specification:

My invention relates to an instrument adapted for determining the temperature of cupolas, blast-furnaces, baking-ovens, &c., by means of which a quantity of the heated air therein is removed and allowed to cool and contract, the amount of contraction determining the temperature of the air before it was cooled, according to the well-known laws governing the expansion and contraction of air at different temperatures.

Figure 1:
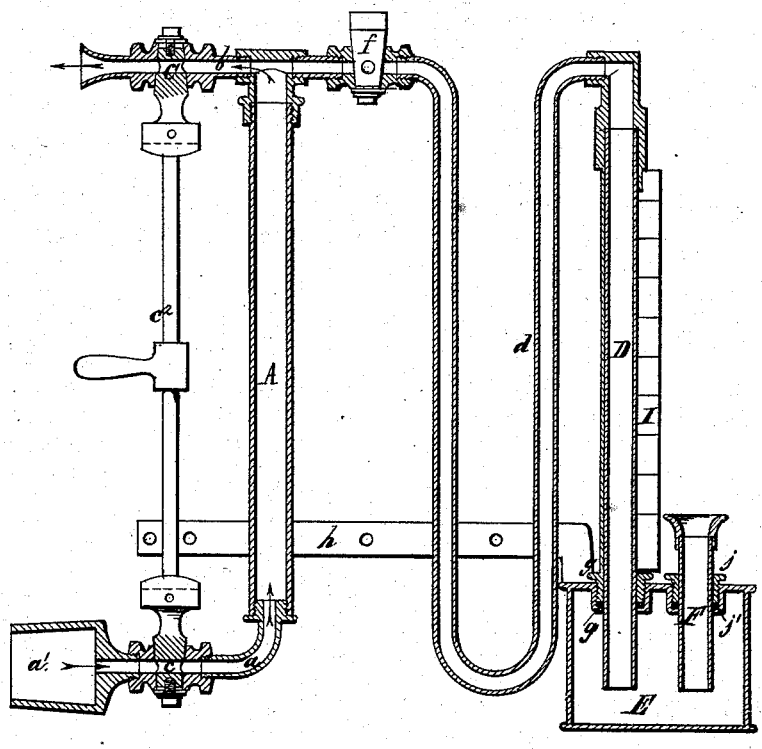
Figure 2:
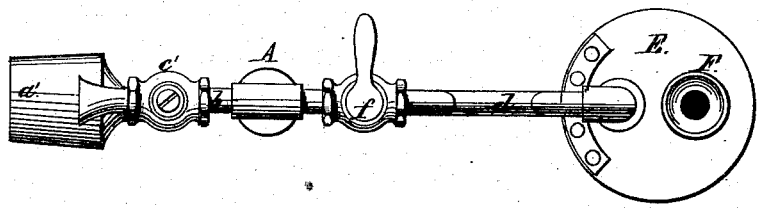

In the accompanying drawing, Figure 1 is a sectional elevation of my improved apparatus. Fig. 2 is a top plan view thereof.

A represents the vessel in which the hot air is confined, and removed from the furnace or other compartment, the temperature of which is to be ascertained; $a$, the air-influx pipe, attached to one end of the vessel A, and terminating in a hollow conical plug, $a'$, or similar device, by which it is connected with the heated compartment. The vessel A is preferably provided with an air-escape pipe, $b$, connecting with the opposite end of the air-vessel A. $c\ c^1$ are two stop-cocks, arranged in the air-pipes $a$ and $b$, respectively, their plugs being attached to the same rod $c^2$, so as to be opened and closed simultaneously. D is the measuring-tube, of glass, arranged vertically, with its foot reaching near the bottom of the reservoir E, filled with water or any other suitable liquid, so that the latter will rise in the tube D when a displacement of air is produced therein above the level of the liquid by the contraction of the volume of air in the vessel A. $d$ is a pipe connecting the upper end of the tube D with the air-vessel A, and provided with a stop-cock, $f$, arranged in close proximity to the air-vessel A. The measuring-tube D is either permanently connected with the air-receiving vessel A, as represented in the drawing, or it may be made separate therefrom and the air-vessel A connected therewith in any suitable manner after the air-vessel has been filled with the heated air. All the joints of the different parts composing the apparatus, whether made in the form of screw-threads or otherwise, are made air-tight. The measuring-tube D is packed tightly in the top plate of the reservoir E by a screw-cap, $g$, and rubber ring $g'$. F is a stand-pipe passing through a similar stuffing-box, $j\ j'$, or otherwise secured in the top of the reservoir E. $h\ h$ are two stay-bars or frames, arranged on opposite sides of the apparatus and secured together by screws, so as to form a rigid connection between the parts thereof when constructed as a single apparatus.

For measuring the heat of air—which is under pressure, as in a blast-furnace—the air-vessel A is connected, by means of the plug $a^1$, with the blast-tube or other compartment containing the heated air, when, on opening the cocks $c\ c^1$, the hot air enters the vessel A through the pipe $a^1$, and escapes therefrom through the pipe $b$, as indicated by arrows in Fig. 1. When the cold air previously contained in the air-vessel A and pipes $a\ b$ is completely expelled therefrom, which is accomplished in a few moments, or has been heated to the temperature of the heated compartment, the cocks $c\ c^1$ are closed so as to confine the heated air contained in the vessel A. The volume of air so imprisoned now cools by radiation, and the vessel A is placed in communication with the measuring-tube D by opening the cock $f$, when the contraction of the air in the vessel A causes the liquid contained in the reservoir E to rise in the tube D until the confined air has cooled down to the temperature of the surrounding atmosphere. The glass tube D is provided with a graduated plate, I, upon which are marked the different degrees of heat, corresponding with the respective heights of the liquid-level in the measuring-tube. The plate I is graduated by inclosing in the vessel A air of various known temperatures, and marking on said plate the heights which the liquid-level has attained in the tube D after the cooling of the air; or the cubic capacity of the reservoir A between the cocks $c\ c^1$ may be made equal to (or in some exact relation to) the cubic contents of the measuring-tube D, in which case the scale may be graduated by the known shrinkage of air. The intervening spaces between the marks so obtained are subdivided more or less finely according to the particular use for which the instrument is required. In order to obtain uniform results with different temperatures of the atmosphere, the liquid-level in the tube D should be adjusted each time the apparatus is used to the height indicating on the scale I the temperature of the surrounding air. The liquid-level in the tube D is raised by adding the required quantity of liquid through the pipe F. The liquid-level is lowered in the tube D in an obvious manner, by discharging the required quantity of liquid through the tube F. When the hot air entering the vessel A is under a pressure of several pounds, as in a hot-air blast, the cock $f$ should not be opened until the air confined in the vessel A is sufficiently cooled to counteract such pressure by its contraction in cooling, in order to prevent the liquid being blown out of the reservoir E. The pipe $d$ connecting the air-vessel A with the measuring-tube D is preferably made of considerable length, so as to interpose a sufficient volume of cold air between the hot air in the vessel A and the liquid in the tube D to prevent partial evaporation of the liquid, which would in a measure tend to counteract the contraction of the cooling air in the vessel A. In order to render the apparatus compact, the pipe $d$ is made of U form, as clearly shown in Fig. 1. Although I prefer to construct the air-vessel A with two oppositely-arranged apertures, so that the hot air may pass through it, the said vessel may be constructed with only one aperture, which is left open when the vessel is placed in the furnace or other heated compartment, and until the air in said vessel has become heated to the temperature of the former, when it is closed and the air-vessel removed from the furnace and connected with the measuring-tube.

What I claim as my invention is—

1. The combination, with a hot-air-receiving vessel, of the measuring-tube and liquid-reservoir, whether permanently or temporarily connected with said vessel, for determining the temperature of the confined air by its contraction while and after cooling, substantially as hereinbefore set forth.

2. The combination with the air-vessel A, influx and escape pipes $a\ b$, and stop-cock $c\ c^1$, of the measuring-tube D, liquid reservoir E, and connecting-pipe $a$, provided with stop-cock $f$, substantially as hereinbefore set forth.

ELIAS S. HAWLEY.

Witnesses:
J. J. BONNER,
ERNST HODDICK.